July 20, 1937.　　　J. CANETTA ET AL　　　2,087,623
FLUID PRESSURE BRAKE
Filed Nov. 23, 1935　　　2 Sheets-Sheet 2

Fig. 2

INVENTORS
JOHN CANETTA
CLYDE C. FARMER
CARLTON D. STEWART
BY Wm. M. Cady
ATTORNEY Patented July 20, 1937

2,087,623

UNITED STATES PATENT OFFICE 2,087,623

FLUID PRESSURE BRAKE

John Canetta, Wilkinsburg, Clyde C. Farmer, Pittsburgh, and Carlton D. Stewart, Swissvale, Pa., assignors to The Westinghouse Air Brake Company, Wilmerding, Pa., a corporation of Pennsylvania Application November 23, 1935, Serial No. 51,329

20 Claims. (Cl. 303—42)

This invention relates to fluid pressure brake equipment and more particularly to the type adapted to operate upon a reduction in brake pipe pressure to effect an application of the brakes.

In Patent No. 2,031,213 issued to Clyde C. Farmer, on February 18, 1936, a brake controlling valve device is disclosed which comprises a service portion adapted to operate upon a service reduction in brake pipe pressure to effect a service application of the brakes, and an emergency portion adapted to operate along with the service portion upon an emergency reduction in brake pipe pressure to effect an emergency application of the brakes.

This emergency portion comprises a piston subject to the opposing pressures of the brake pipe and a quick action chamber, and further comprises a main slide valve and an auxiliary slide valve mounted on the main slide valve, these slide valves being controlled by said piston.

Upon a service reduction in brake pipe pressure this piston is adapted to move the auxiliary slide valve relative to the main slide valve to a service position in which communication is established between the quick action chamber and atmosphere, through which the pressure of fluid in the quick action chamber is adapted to be reduced at such a rate relative to the service rate of reduction in brake pipe pressure, as will prevent obtaining a sufficient differential of pressures on said piston to move said piston past the service position. This communication is of such restricted flow area that the quick action chamber pressure is reduced only at a service rate, so that when the brake pipe pressure is reduced at a more rapid or emergency rate a sufficient differential of pressures is obtained on said piston to move said piston and thereby the auxiliary slide valve to emergency position to effect an emergency application of the brakes.

In the equipment above referred to the emergency portion is designed to be moved to emergency position when a small differential of pressures, such for instance as one pound, is obtained on the emergency piston in order to obtain prompt response of said piston to an emergency reduction in brake pipe pressure and thereby provide for fast serial transmission of emergency operation throughout a train. The piston and auxiliary slide valve of the emergency portion are so proportioned however, that a very light differential of pressures on the piston, such for instance as 0.4 of a pound, will shift these parts to service position, and a spring pressed plunger is provided to define the service position, and the pressure of this spring has to be overcome in order that the piston and valve will move to emergency position. This construction provides a margin between the service and emergency pressure differentials, as governed by the pressure of the spring just mentioned, which is considered to be more than adequate to prevent undesired movement of the parts to emergency position.

Under all normal conditions this emergency portion will function as above described and therefore in the manner intended. If, however, foreign matter should collect around the piston or auxiliary slide valve and increase the static friction or resistance to movement of these parts, it is possible that even upon a service reduction in brake pipe pressure, movement of these parts from the normal position may be so delayed as to permit the build up of a differential capable of moving the parts to emergency position, before the parts start to move. Then when the parts start moving, if the kinetic friction of the parts is relatively low, the parts may jump from their normal position through service position directly to emergency position and thereby initiate an emergency reduction in brake pipe pressure. An emergency application of the brakes will then be obtained throughout the train when not intended. This is undesirable for various reasons, such as, it will interfere with the operating schedule of the train and may also interfere with the operation of other trains on the same track.

The principal object of this invention is to provide means, adapted to be associated with a brake equipment of the type disclosed in the above mentioned pending application, for obviating the possibility of obtaining upon a service reduction in brake pipe pressure, an undesired emergency application of the brakes as above described.

Other objects and advantages will be apparent from the following more detailed description of the invention.

In the accompanying drawings.

The portion of a fluid pressure brake equipment shown in the drawings is substantially the same as a similar portion of the brake equipment disclosed in the aforementioned pending application, but only those parts are shown which are deemed necessary to a comprehensive understanding of the invention.

Figure 1:
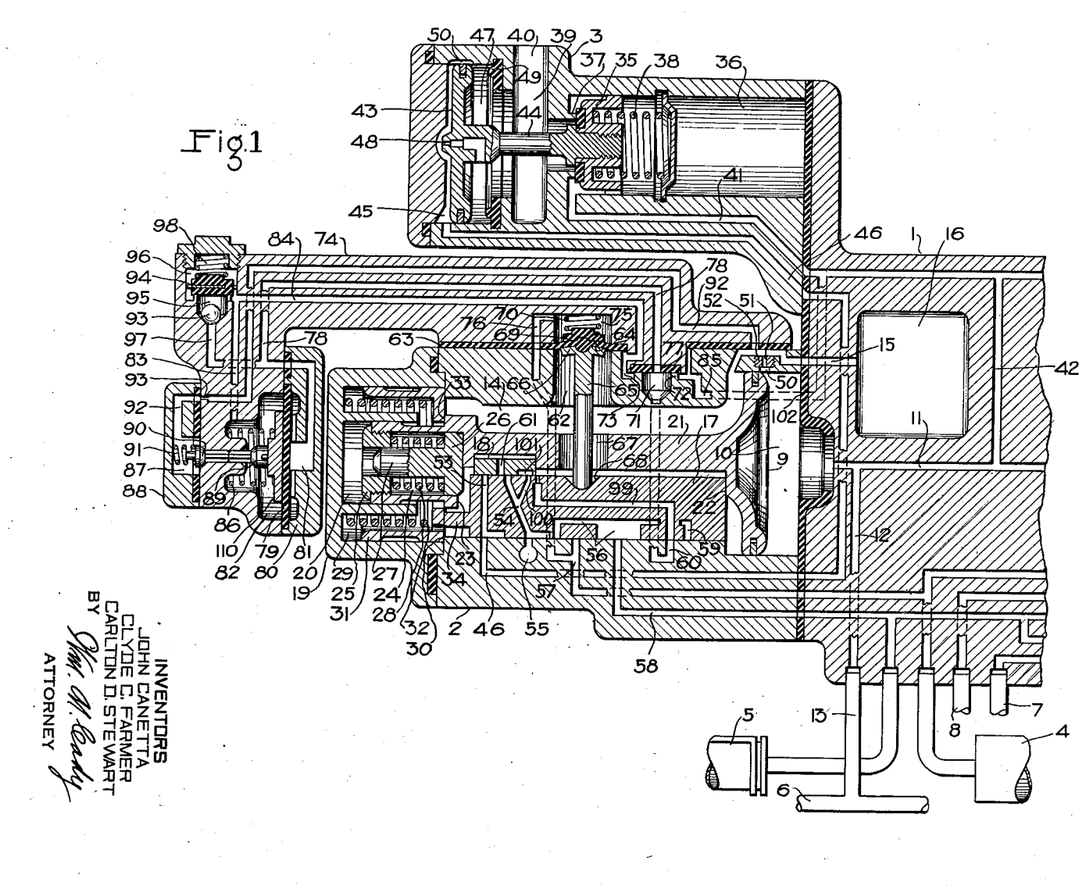
Fig. 1 is a diagrammatic view, mainly in section, of a portion of a fluid pressure brake equipment embodying one form of the invention.

The fluid pressure brake equipment shown in Fig. 1 comprises a pipe bracket 1, only a portion of which is shown, an emergency valve device 2 mounted on one face of said pipe bracket, a brake pipe vent valve device 3 mounted on said pipe bracket, and an emergency reservoir 4, brake cylinder 5 and brake pipe 6 connected to said pipe bracket. The pipe bracket 1 is also connected to a pipe 7 which leads to an auxiliary reservoir (not shown) and to a brake release pipe 8 which is connected to a retaining valve device (not shown).

The emergency valve device 2 comprises a casing containing an emergency piston 9 having at one side a chamber 10 connected to the brake pipe 6 through passages 11 and 12 and a branch pipe 13. The piston 10 has at the opposite side a valve chamber 14 which is connected to a passage 15 leading to a quick action chamber 16. Disposed in the chamber 14 are a main slide valve 17 and an auxiliary slide valve 18 adapted to be operated by the piston 10.

The left hand end of the valve chamber 14 is closed by a cover 19 in which there is provided a bore 20 arranged axially of the piston 10. The piston 10 has a stem 21, the end of which is slidably mounted in the bore 20. The stem 21 has a recess in which the auxiliary slide valve 18 is disposed, while the main slide valve 17 is disposed between a shoulder 22 provided on the back of piston 10 and a shoulder 23 formed on the stem 21.

A bore 24 is provided in the end of the piston stem 21, the outer end of this bore being closed by a plug 25, while the inner end of the bore extends beyond the shoulder 23 in a direction toward the piston 10. A plunger 26 is slidably mounted in this bore and has a stem 27 mounted in a suitable bore in the plug 25. A spring 28 is interposed between the plug 25 and plunger 26 and acts to urge said plunger into engagement with the inner end of the bore 24, in which position the right hand face of said plunger is disposed between the shoulder 23 and the adjacent end of the main slide valve 17.

The cover 19 is provided with an annular chamber 29 surrounding the portion of the cover in which bore 20 is formed. This chamber is of slightly greater diameter than that of the valve chamber 14 so as to provide a shoulder 30 on the end of the emergency valve casing. A stop 31 is slidably mounted in the chamber 29 and is urged into engagement with the shoulder 30 by means of a spring 32 disposed in said chamber. The stop 31 is provided with a central opening through which the piston stem 21 extends into the bore 20, and the piston stem is provided with an annular shoulder 33 adapted to engage said stop for defining the normal position of the piston 9 and auxiliary slide valve 18, while the main slide valve is provided with a lug 34 adapted to engage said stop for defining the normal position of the main slide valve, these elements being shown in their normal position in the drawings.

The brake pipe vent valve device 3 comprises a vent valve 35 contained in a chamber 36 and urged into engagement with a seat rib 37 by means of a spring 38 for closing communication between said chamber and a chamber 39 which is open to the atmosphere through a passage 40. The chamber 36 is in constant communication with the brake pipe 6 through passages 41, 42, 11, 12 and branch pipe 13.

The vent valve device further comprises a movable piston 43 having a stem 44 which extends through the chamber 39 and which is secured to the vent valve 35. This piston has at one side a chamber 45 connected to a passage 46 which leads to the seat of the main slide valve 17, and has at the opposite side a chamber 47 open to chamber 39. A restricted port 48 is provided through the piston 43. A gasket 49 is provided in the casing at the right hand side of piston 43 and is adapted to be engaged thereby upon movement in a direction toward the right hand. A leakage groove 50 is provided in the casing for connecting chamber 45 to chamber 47 when the piston 43 is in the normal position, as shown in the drawings.

In the normal position of the emergency piston 9, a port 50 in the casing is open to piston chamber 10 and leads to a restricted port 51 provided in a choke plug 52, the port 51 connecting port 50 to passage 15 which connects the emergency valve chamber 14 and quick action chamber 16 together.

The main slide valve 17 is provided with passages 53 and 54 which in the normal position, and back dump position, which will be hereinafter described, of said slide valve register with the vent valve passage 46 and an atmospheric passage 55, respectively, and is further provided with a cavity 56 adapted in the emergency position of said slide valve, which position will be hereinafter described, to connect passage 57 from the emergency reservoir 4 to passage 58 which leads to the brake cylinder 5. This cavity 56 is provided with an extension 59 adapted to connect the brake cylinder passage 58 to a back dump passage 60 in the back dump position of the main slide valve 17, as will be hereinafter described. The passage 60 leads to a chamber 71 around the upper edge of which there is provided an upstanding annular seat rib 72 which projects into a chamber 73.

The auxiliary slide valve 18 normally laps the ports 53 and 54 which open at the seat of said slide valve, and a service or breather port 61 is provided through said valve and is adapted upon movement of said valve toward the right hand, relative to the main valve 17, to register fully with port 54 before the auxiliary slide valve 18 commences to uncover the port 53.

The plunger 26 is adapted to just engage the left hand end of the main slide valve 17 when the port 61 is in full registration with port 54 as just described. The plunger 26 therefore defines this position of the auxiliary slide valve 18, which position is the service position of said valve. Further movement of the auxiliary slide valve 18 toward the right hand to uncover the emergency port 53 is then opposed by the spring 28, and shoulder 23 on the piston stem 21 is adapted to engage the left hand end of the main slide valve 17 when the port 53 becomes uncovered.

An opening 62 is provided through the emergency valve device casing and leads to a face upon which there is disposed a gasket 63. The opening 62 is closed by a flexible diaphragm 64 formed integral with the gasket 63. A rocking pin 65 having a head 66 engaging the diaphragm 64 within opening 62 extends through said opening and an opening 67 in the piston stem 21 and engages the main slide valve 17 within a recess 68. A follower 69 is disposed on the opposite side of the diaphragm 64 and is subject to the pressure of a spring 70 which acts through the diaphragm 64 on the rocking pin 65 to exert its pressure on the slide valve 17.

The emergency valve device 2 as so far described is substantially the same as that disclosed in the aforementioned pending application. According to the invention a special cover 74 is secured to the emergency valve device against the gasket 63 and is provided with a chamber 75 containing the follower 69 and spring 70, the chamber 75 being connected to a passage 76 leading to the emergency reservoir passage 57 in the emergency valve casing.

The cover 74 is provided with an extension in the end of which there is disposed a gasket 77, this extension being disposed in chamber 73 with the gasket 77 in sealing engagement with the seat rib 72. Communication is thereby closed between chamber 71 and chamber 73, and chamber 71 is connected through the gasket 77 to a passage 78 in the cover 74.

A flexible diaphragm 79 is clamped between a face on the cover 74 and a plate 80 secured to said cover. This diaphragm has at one side a chamber 81 connected to passage 78 and at the opposite side a chamber 82 which is in constant communication with the brake pipe 6 by way of passages 83 and 84, chamber 73, passages 85, 41, 42, 11, and 12 and branch pipe 13.

A follower plate 110 is disposed in chamber 82 in engagement with one face of the diaphragm 79, and a spring 86 of predetermined value is also disposed in said chamber and acts on the follower plate 110.

The cover 74 is provided with a bore connecting chamber 82 to a chamber 87 which is formed in a plate 88 secured to said cover. A valve 89 is disposed in chamber 82 and has a fluted stem slidably disposed in the bore leading to chamber 87, while an oppositely seating valve 90 is disposed in chamber 87 and has a fluted stem slidably disposed in said bore and engaging the stem of valve 89. A spring 91 in chamber 87 acts on the valve 90 urging said valve into engagement with its seat and urging the valve 89 away from its seat and into engagement with the diaphgram follower plate 110. The valve chamber 87 is connected to a passage 92 which leads through the plate 88 and cover 74 to the passage 15 which connects the emergency valve chamber 14 and quick action chamber 16 together. A choke or restriction 93 may be provided in passage 92 for controlling the rate of flow of fluid under pressure through said passage under conditions which will be hereinafter described.

Two serially arranged check valves 93 and 94 are disposed in chambers 95 and 96, respectively, formed in the cover 74, for preventing flow of fluid under pressure from the brake pipe passage 84 to a passage 97 which is connected to the passage 78. A spring 98 of predetermined value is provided in chamber 96 and acts on the check valve 94 to hold same seated to prevent flow of fluid under pressure in the reverse direction until a predetermined differential is established between the opposing pressures acting on said check valve as will be hereinafter more fully described.

According to the invention, ports 99 and 100 are provided in the main slide valve 17 and a cavity 101 is provided in the auxiliary slide valve 18. The port 99 is adapted to register with the back dump passage 60 when the main slide valve 17 is in the normal position, as shown in the drawings. This port leads to the seat of the auxiliary slide valve 18 and is open to the emergency valve chamber 14 past the right hand end of said slide valve when in its normal position, as shown in the drawings. The port 100 connects to the service vent port 54 and leads to the seat of the auxiliary slide valve 18, while the cavity 101 in said slide valve is provided to connect ports 99 and 100 when the auxiliary slide valve is in service position as defined by the engagement of plunger 26 with the left hand end of the main slide valve 17.

In the drawings, the port 99 where it opens at the seat of the auxiliary slide valve 18 is shown reduced in size, but this is not to indicate a restriction in said port, it is merely to permit said slide valve to control said port in the manner above described. This port is merely a control port as will be evident from the following description, and its capacity to permit flow of fluid under pressure is therefore not critical.

In operation, in order to initially charge the equipment, fluid under pressure is supplied to the brake pipe 6 in the usual well known manner and from thence flows through the branch pipe 13 and passage 12 to passage 11. From passage 11, fluid under pressure flows in a direction toward the right hand to the service portion (not shown) of the brake equipment which operates to connect the brake cylinder 5 to the atmosphere and to charge the emergency reservoir 4 in the manner described in the aforementioned pending application, which operation however is not involved in the invention.

Fluid under pressure supplied to passage 11 flows in a direction toward the left hand to the emergency piston chamber 10. With the parts of the emergency valve device 2 in the normal position shown in the drawings, fluid under pressure flows from piston chamber 10 through the restricted port 51 to passage 15 and from thence to the emergency valve chamber 14 and quick action chamber 16. From the emergency valve chamber 14, fluid under pressure flows past the right hand end of the auxiliary slide valve 18 to port 99 and from thence through passage 60, chamber 71, and passage 78 to diaphragm chamber 81. From the quick action chamber charging passage 15, fluid under pressure flows through passage 92 to valve chamber 87.

Fluid under pressure supplied from the brake pipe to passage 11 also flows through passages 42 and 41 to the vent valve chamber 36, and from passage 41 through passage 85, chamber 73 and passages 84 and 83 to diaphragm chamber 82.

Chambers 81 and 82 thus become charged to the same pressure which permits spring 86 to maintain the diaphragm 79 in the normal position shown in the drawings, and permits the light bias spring 91 to hold valve 90 seated and valve 89 unseated.

After the equipment is charged with fluid under pressure, if it is desired to effect a service application of the brakes, a gradual reduction in brake pipe pressure is effected in the usual well known manner. This reduction in brake pipe pressure causes operation of the service portion (not shown) of the brake equipment to supply fluid under pressure to the brake cylinder 5 in the manner described in the aforementioned pending application.

In the emergency valve device 2, the pressure of fluid in piston chamber 10 reduces with the service reduction in brake pipe pressure at a rate exceeding the rate at which the pressure of fluid in the valve chamber 14 and quick action chamber 16 can reduce by flow of fluid under pressure back to the brake pipe through the restricted port 51.

If the emergency valve device operates as intended, that is, if the static resistance to movement of the piston 9 and auxiliary slide valve 18 is not greater than a predetermined degree, then when the pressure in piston chamber 10 becomes reduced to a degree slightly lower, for instance 0.4 of a pound, than the pressure in valve chamber 14, this differential of pressures shifts the piston 9 and auxiliary slide valve 18 towards the right hand into service position in which port 61 registers with port 54. Through these ports fluid under pressure is vented from the emergency valve chamber 14 and quick action chamber 16 to the atmosphere by way of the atmospheric passage 55. This venting of fluid under pressure is adapted to reduce the pressure acting on the left hand side of the emergency piston 9 at as fast a rate as the opposing brake pipe pressure in chamber 10 is reduced upon a service reduction in brake pipe pressure, and thereby prevents an increase in the differential of pressures on the emergency piston 9 which would tend to keep said piston moving past the service position to the emergency position, which will be described later.

Service position of the emergency piston 9 and auxiliary slide valve 18 is defined by the engagement of plunger 26 with the end of the main slide valve so that continued movement past service position requires an increase in the differential of pressures on the piston 9 sufficient to compress the spring 28 acting on said plunger. Such an increase in the differential of pressures on piston 9 is not however obtained if said piston and the auxiliary slide valve 18 are moved upon the small differential hereinbefore noted, on account of the venting of fluid under pressure from and the consequent reduction in pressure in the valve chamber 14.

If only a partial service reduction in brake pipe pressure is effected, then when the pressure in the emergency valve chamber 14 becomes reduced sufficiently below brake pipe pressure in chamber 10, the higher brake pipe pressure in chamber 10 moves the piston 9 and slide valve 18 back to their normal position in which port 54 in the main slide valve 17 is lapped by the auxiliary slide valve 18 so as to prevent further venting of fluid under pressure from the valve chamber 14.

A release of the brakes after a service reduction in brake pipe pressure is accomplished by increasing the pressure of fluid in the brake pipe 6 in the manner above described in initial charging of the equipment.

If it is desired to effect an emergency application of the brakes a sudden reduction in brake pipe pressure is effected. This causes the service portion (not shown) of the equipment to operate in the same manner as in effecting a service reduction in brake pipe pressure.

The sudden reduction in brake pipe pressure causes a corresponding reduction in pressure in the emergency piston chamber 10 which is so fast as compared to the venting capacity of port 51 to reduce the pressure of fluid in the emergency valve chamber 14 and quick action chamber 16, that sufficient differential of pressures is promptly obtained on the piston 9 to move said piston to service position above described. In this position the pressure in the emergency valve chamber can not reduce through ports 61 and 54 as fast as the brake pipe pressure is reducing, so that the pressure differential on said piston quickly becomes such as to overcome the pressure of spring 28 and move said piston and the auxiliary slide valve 18 on to the emergency position defined by the engagement of shoulder 23 on the piston stem 21 with the end of the main slide valve 17.

In this emergency position of the auxiliary slide valve 18, port 53 is uncovered and opened to the valve chamber 14 which permits fluid under pressure to flow from said chamber and the quick action chamber 16 to passage 46 and from thence to the vent valve piston chamber 45.

This supply of fluid to chamber 45 so exceeds the venting capacity of the leakage groove 50 around the piston 43 and the restricted port 48 through said piston that sufficient pressure is promptly obtained in said chamber on said piston to overcome the opposing pressure of spring 38 acting on the vent valve 35 and move said piston toward the right hand into sealing engagement with the gasket 19.

This movement of piston 43 unseats the vent valve 35 which permits fluid under pressure to rapidly flow from brake pipe 6 to the atmosphere by way of branch pipe 13, passages 12, 11, 42, 41, chamber 36, past the vent valve 35 to chamber 39 and from thence through the atmospheric passage 40. This sudden emergency reduction in brake pipe pressure is transmitted from car to car through a train by the operation of the emergency valve device and vent valve device on each car in the manner above described, as will be evident.

When the pressure of fluid in the emergency piston chamber 10 becomes reduced sufficiently below the pressure of fluid in the valve chamber 14 that the differential of pressures on the emergency piston 9 can overcome the static resistance to movement of the main slide valve 17, said piston moves said slide valve toward the right hand to a position defined by the engagement of said piston with a gasket 102.

In this position of the emergency slide valve 17, the cavity 56 connects the emergency reservoir passage 57 to the brake cylinder passage 58 so that fluid under pressure is permitted to flow from the emergency reservoir 4 to the brake cylinder 5 for producing high emergency brake cylinder pressure as is obtained in the equipment hereinbefore referred to. Also in this position of the main slide valve the passage 46 is opened to the emergency valve chamber 14 past the left hand end of the main slide valve 17 in order to maintain the supply of fluid under pressure to the vent valve piston chamber 45.

Fluid under pressure thus supplied to the vent valve piston chamber 45 gradually flows to the atmosphere through the restricted vent port 48 in the vent valve piston 43. The size of this vent port is so proportioned to the volume of the emergency valve chamber 14 and quick action chamber 16 that sufficient pressure will be maintained on the piston 43 to hold the vent valve 35 unseated against the pressure of spring 38 until the brake pipe pressure is reduced to substantially atmospheric pressure, after which the spring 38 acts to seat the vent valve 35 so as to permit the brake pipe to be recharged for effecting a release of the brakes, whenever it is desired to do so.

In order to effect a release of the brakes after an emergency application, fluid under pressure is supplied to the brake pipe 6 and from thence flows to the service portion (not shown) of the brake equipment and to piston chamber 10 in the emergency valve device 2.

Adjacent the locomotive, the rate of increase in brake pipe pressure is initially rapid, and the consequent increase in pressure in chamber 10 moves the piston 9 and slide valves 17 and 18 back to their normal position as defined by the engagement of shoulder 33 on the piston stem 21 with the stop 31. The capacity of the restricted port 51 is insufficient to charge the valve chamber 14 and quick action chamber 16 as rapidly as the brake pipe pressure is increased and consequently a differential of pressures is obtained on piston 9 which overcomes the pressure of spring 32 on the stop 31 and then moves said piston and the slide valves 17 and 18 to a back dump position as defined by the engagement of the piston with the casing.

In this back dump position the cavity 56 and extension 59 connect the brake cylinder passage 58 to the back dump passage 60 so that fluid under pressure is permitted to flow from the brake cylinder 5 to the passage 60 and from thence through chamber 71, passages 78 and 97 to the seated face of check valve 93 and thence past said check valve to chamber 95 and act on the seated face of check valve 94. Chamber 96 at the opposite side of check valve 94 is in constant communication with the brake pipe 6 by way of passages 84, chamber 73, passages 85, 41, 42, 11, 12 and branch pipe 13 and is therefore at all times charged with brake pipe pressure. When the brake cylinder pressure obtained in chamber 95 is increased to a degree which overcomes the opposing brake pipe pressure and that of spring 98 acting on the check valve 94, said check valve is unseated which permits fluid under pressure to rapidly flow from the brake cylinder 5 back into the brake pipe. This flow continues until the brake pipe pressure is increased to within the value of spring 98 of the pressure of fluid in the brake cylinder, at which time the spring 98 seats the check valve 94.

This back dump of fluid under pressure from the brake cylinder to the brake pipe effects a sudden local increase in brake pipe pressure which is transmitted to the next car and effects like back dump operation of the valve device on that car. This operation is therefore serially transmitted through a train. The pressure of spring 98 on the check valve 94 is such as to prevent equalization between brake cylinder and brake pipe pressures upon the back dump operation just described, in fact the said spring acts to hold in the brake cylinder a pressure, such for instance as 15 pounds, in excess of brake pipe pressure at the time said check valve is seated, for reasons which are described in the aforementioned pending application and which is not involved in the attainment of the present invention.

When in effecting a release of the brakes after an emergency application, the pressure of fluid in the emergency valve chamber 14 and quick action chamber 16 has been increased sufficiently, by flow through the restricted port 51, that the differential on the emergency piston 9 becomes reduced below the pressure of spring 32, said spring acts through the stop 31 to shift said piston and the valves 17 and 18 back to their normal position as defined by the engagement of stop 31 with shoulder 32 in the casing, as shown in the drawings, after which the equipment is completely recharged in the manner hereinbefore described in connection with the initial charging of the equipment.

It will now be noted that under normal conditions the emergency piston 9 is adapted to move the auxiliary slide valve 18 to service position upon attaining a slight differential of pressure, such as 0.4 of a pound, on said piston. A slight increase in pressure differential, such for instance as 0.6 of a pound, is then required on the piston 9 to compress the spring 28, and move the auxiliary slide valve 18 to emergency position. In other words about a 1 pound differential of pressures is required on the piston 9 to move said piston and the auxiliary slide valve 18 to emergency position.

It is possible that foreign matter may accumulate in a brake controlling valve device and act to increase the force required to start a valve or piston moving, but after the valve or piston starts moving, the force necessary to maintain their motion may be relatively low. Assuming that the parts of the emergency valve device are designed to operate on the pressure differentials above noted, it will be evident that the static friction of the piston and auxiliary slide valve may become increased, due to foreign matter or otherwise, to such a degree as to require a pressure differential greater than 0.4 of a pound to overcome said static friction, but as long as this pressure differential plus the inertia of said piston and auxiliary slide valve after they start moving is not sufficient to move said slide valve to emergency position against the opposing pressure of spring 28, the emergency valve device will operate as intended. In other words, as long as the static resistance to movement of the emergency piston 9 and auxiliary slide valve does not require a differential of pressures on said piston greater than a certain amount, such for instance as substantially one pound, to start said piston and valve moving, the action of spring 28 will prevent undesired movement of these parts to emergency position upon a service reduction in brake pipe pressure; but if the static resistance becomes such as to require a differential of pressures greater than said certain amount to start said piston and valve moving, this greater differential plus the inertia of the moving piston and valve may be sufficient to overcome the pressure of spring 28 and move said valve to emergency position and thereby initiate an undesired emergency application of the brakes upon effecting a service reduction in brake pipe pressure.

The diaphragm 79, valves 89 and 90 and spring 86 are provided to prevent this undesired operation of the emergency valve device 2 upon a service reduction in brake pipe pressure, said diaphragm, valve and spring being so designed as to operate at a differential of pressures, which if allowed to accumulate on the emergency piston due to failure of the emergency piston to move as intended would be liable to cause said piston to move to emergency position when not intended.

The diaphragm 79 is normally subject in chamber 81 to the pressure of fluid in the emergency valve chamber 14 and quick action chamber 16 through passage 78, chamber 71, back dump passage 60, and port 99 in the main slide valve 17, while in chamber 82 the diaphragm is at all times subject to brake pipe pressure plus the pressure of spring 86. This spring is so designed with respect to the area of diaphragm 79 as to permit deflection of said diaphragm towards the left hand upon a reduction in brake pipe pressure when the brake pipe pressure in chamber 82 is reduced below the quick action chamber pressure in chamber 81 a predetermined degree, such for instance as just less than one pound. Assuming a one pound differential between the pressures in the brake pipe and quick action chamber on the emergency piston 9 as the critical pressure which might cause the emergency valve device to operate to effect an emergency application of the brakes, it will be evident that the diaphragm 79 will be deflected toward the left hand just before this emergency differential is obtained.

This deflection of diaphragm 79 acts upon a service reduction in brake pipe pressure to unseat the valve 90 without seating the valve 89, which permits fluid under pressure to flow from the emergency valve chamber 14 and quick action chamber 16 to the brake pipe 6 by way of passages 15, 92, choke 93, chamber 87, and past the valves 90 and 89 to chamber 82 and thence to the brake pipe. The pressure in the emergency valve chamber 14 is thus reduced at such a rate relative to a service rate of reduction in brake pipe pressure as to prevent an increase in the differential of pressures on the piston 9. By thus limiting the pressure differential, which it is possible to obtain on the emergency piston 9, to a degree which will not move said piston and the auxiliary slide valve to emergency position, undesired emergency operation of the emergency valve device upon a service reduction in brake pipe pressure is prevented.

If, as above described, the emergency piston 9 fails to move upon a service reduction in brake pipe pressure, the differential of pressures on the diaphragm 79 acts to maintain the valve 90 unseated until the pressure in the emergency valve chamber 14 becomes reduced to substantially the brake pipe pressure, at which time the spring 86 deflects said diaphragm towards the right hand and permits spring 91 to seat the valve 90.

If for any reason the emergency valve device should respond to a service reduction in brake pipe pressure after or at the same time the diaphragm 79 operates to unseat the valve 90, the movement of the auxiliary slide valve 18 on the main slide valve 17 vents fluid under pressure from the diaphragm chamber 81 to the atmosphere through passages 78 and 60, port 99, cavity 101 in the auxiliary slide valve and atmospheric ports 100 and 54 in the main slide valve 17. With the diaphragm chamber 81 thus vented to the atmosphere, brake pipe pressure in chamber 82 holds the diaphragm 79 in its normal position in which spring 91 urges the valve 90 to its seat. Thus, fluid under pressure can not be vented from the emergency valve chamber 14 and quick action chamber 16 by the simultaneous operation of the auxiliary slide valve 18 and the poppet valve 90. In the manner just described it will be evident that the valve 90 is rendered ineffective when upon a service reduction in brake pipe pressure the emergency valve device operates as intended. This is desirable whenever the emergency valve device operates upon a service reduction in brake pipe pressure in that it limits the rate at which fluid can be vented from the emergency valve chamber 14 and quick action chamber 16 to the proper degree to ensure obtaining the required differential on the piston 9 to move same and the auxiliary slide valve 18 to emergency position upon an emergency reduction in brake pipe pressure.

It is desired to call attention to the fact that when the poppet valve 90 is unseated, the capacity of the communication thus established through which fluid under pressure is vented from the emergency valve chamber 14 and quick action chamber 16 is such as to permit the pressure of fluid in said chambers to reduce by flow to the brake pipe at substantially the same rate as the pressure in said chambers is reduced by flow to the atmosphere through ports 61 and 54 in slide valves 18 and 17 when the emergency valve device operates as intended. This communication controlled by poppet valve 90 is sufficiently restricted however, as by the choke 93, to ensure emergency operation of the emergency valve device upon an emergency reduction in brake pipe pressure, as is the case with ports 61 and 54 in the slide valves 18 and 17.

When an emergency reduction in brake pipe pressure is effected, the emergency valve device 2 operates in the same manner as hereinbefore described regardless of the static friction condition of the parts, since the reduction in brake pipe pressure is so rapid as to promptly provide on the piston 9 a differential of pressures which will ensure movement of said piston and the auxiliary slide valve 18 to emergency position.

In emergency operation, it is possible that the main slide valve 17 will be moved and thereby lap the passage 60 so quickly as to bottle up fluid under pressure in diaphragm chamber 81. With the brake pipe pressure suddenly reduced in diaphragm chamber 82, the pressure of fluid in chamber 81 promptly deflects said diaphragm towards the left hand, against the pressure of spring 86, and unseats the valve 90 and seats the valve 89. The seating of valve 89 prevents the flow of fluid from the emergency valve chamber 14 and quick action chamber to the brake pipe 6 as is the case in effecting a service application of the brakes, thereby ensuring that the fluid under pressure in these chambers will be vented only by way of the restricted port 48 in the vent valve piston 43 so as to maintain the brake pipe vent valve 35 unseated for a predetermined period of time, as hereinbefore described.

It will be noted that, since diaphragm chamber 81 is connected through passages 78 and 97 and past the check valve 93 to chamber 95, if the pressure bottled up in said chamber 81 by movement of the slide valve 17 exceeds the opposing pressure of spring 96 on the back dump check valve 94, the check valve 94 will be unseated and permit the pressure in chamber 81 to reduce into the vented brake pipe to a degree at which said spring can seat the check valve, but this reduced pressure in chamber 81 is sufficient under these conditions to maintain the valve 89 seated.

From the above description of operation it will be noted that the valve device including the diaphragm 79 and valve 90 is provided to perform the service function of the emergency valve device 2 only in case the emergency valve device 2 does not operate upon a service reduction in brake pipe pressure, as it may fail to do under certain abnormal conditions. In other words, the diaphragm 79 is so controlled by spring 86 that the emergency valve device will always function, if in condition, upon a service reduction in brake pipe pressure, so as to maintain said parts as free and sensitive to slight pressure differentials as possible.

When the emergency valve device operates as intended fluid under pressure is vented from the quick action chamber to the atmosphere by way of ports 61 and 54, while when the diaphragm controlled valve 90 is operated fluid under pressure is vented from the quick action chamber to the brake pipe, the pressure in the brake pipe at the time of such venting being only slightly lower than that in the quick action chamber. As a result, the venting communication by way of valve 90 must be larger than that through ports 61 and 54, in order to reduce the quick action chamber pressure at the same rate as it is reduced through ports 61 and 54, when the emergency valve device operates as intended.

This large venting communication is obtained in the embodiment of the invention above described by the use of the diaphragm controlled valve 90, the operation of which is controlled by the emergency valve device which is therefore in effect merely a pilot valve device for the diaphragm controlled valve device. The ports 99 and 100 and cavity 101 therefore may be small since they merely control the fluid under pressure in the small diaphragm chamber 81, and this permits the incorporation of these ports and the cavity 101 in the emergency valve device disclosed in the aforementioned pending application, and since the cover 74 including the diaphragm controlled service vent valve 90 is adapted to be applied to said emergency valve device, the means for preventing undesired emergency operation of said device may be embodied therein without excessive modification of said device.

Figure 2:
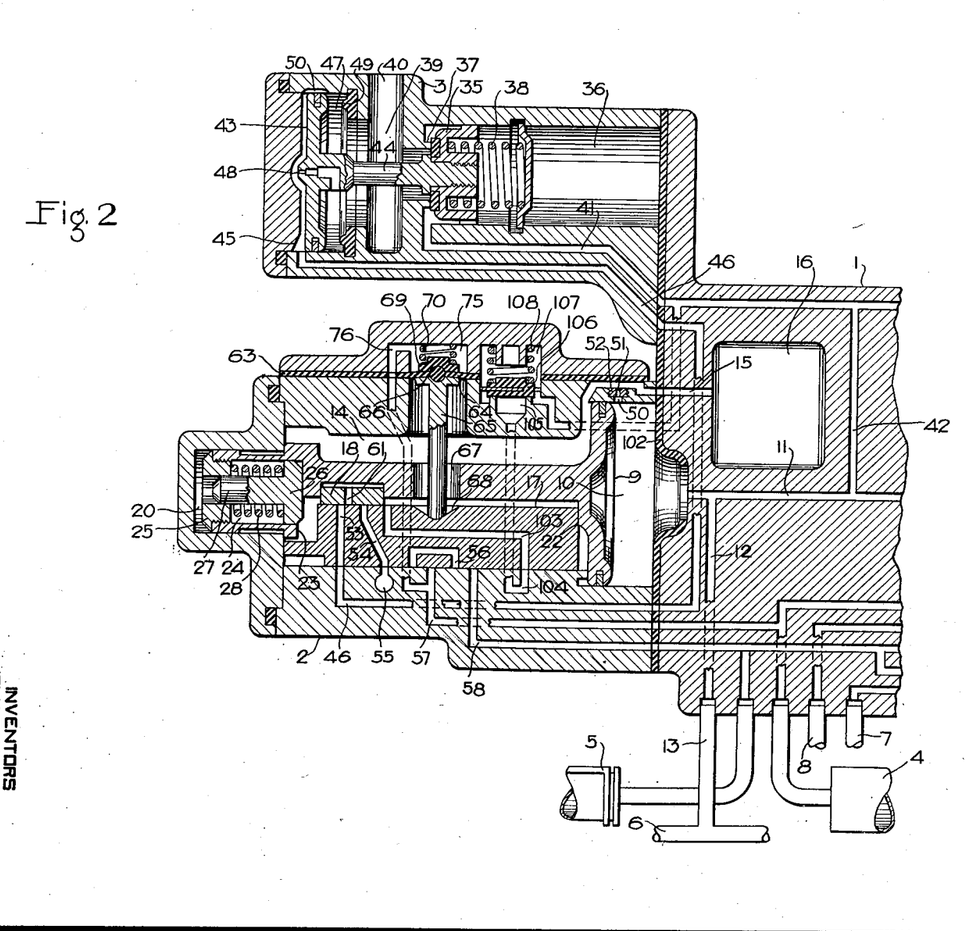
Fig. 2 is a view similar to Fig. 1 embodying another form of the invention.

In the form of the invention shown in Fig. 2, the function of the diaphragm controlled valve 90 shown in Fig. 1 is embodied in the emergency valve device per se.

The construction of the emergency valve device shown in Fig. 2 is substantially the same as that shown in Fig. 1 except that the cover 74 and valve elements embodied therein are dispensed with and the parts of the emergency valve device shown in Fig. 2 are designed so as to perform the functions of said valve elements in case the emergency valve device fails to operate as intended upon a service reduction in brake pipe pressure.

In the construction shown in Fig. 2 a port 103 is provided in the main slide valve 17 which in the normal position of said slide valve connects to a passage 104 which opens at the seat of said slide valve, the port 103 also opening at the seat of the auxiliary slide valve 18 just ahead of said auxiliary slide valve so as to be lapped thereby before port 61 registers with port 54 upon movement of said auxiliary slide valve toward service position. The flow capacity of this port 103 corresponds substantially to that of the communication controlled by valve 90 in the construction shown in Fig. 1 of the drawings and is therefore greater than that of pilot port 99 in the construction shown in Fig. 1.

The passage 104 leads to a chamber 105 at one side of a check valve 106 contained in a chamber 107 which is connected to the brake pipe 6 through passages 78, 41, 42, 11, 12 and branch pipe 13. The check valve 106 is therefore subject to quick action chamber presure in chamber 105 and brake pipe pressure in chamber 107 as is the case with valve 90 in the construction shown in Fig. 1 of the drawings. A spring 108 contained in chamber 107 acts to urge the check valve 106 seated with a predetermined pressure which may be equal to substantially a one pound differential between the fluid pressures in chambers 105 and 107. This spring acting on the check valve 106 therefore corresponds in value with respect to the seated area of said check valve to that of spring 86 acting on the diaphragm 79 in the construction shown in Fig. 1.

Except as above noted, the ports and cavities in the emergency valve device are arranged to function like corresponding ports and cavities in the construction shown in Fig. 1.

In operation, if the emergency valve device shown in Fig. 2 is in condition to operate as intended, then upon a service reduction in brake pipe pressure, the piston 9 will shift the auxiliary slide valve 18 in a direction toward the right hand to service position, as defined by the engagement of plunger 26 with the end of the main slide valve 17. In this position quick action chamber pressure will be reduced through the service vent ports 61 and 54 at such a rate relative to the service rate of reduction in brake pipe pressure as to prevent movement of the piston 9 and auxiliary slide valve 18 past the service position, in the same manner as described in connection with the construction shown in Fig. 1.

If upon a service reduction in brake pipe pressure, the emergency piston 9 and auxiliary slide valve 18 fail to respond as intended, then just before the brake pipe pressure becomes reduced below the quick action chamber pressure a degree which would be liable to cause undesired movement of the emergency valve device to emergency position, quick action chamber pressure in chamber 105 unseats the check valve 106 against the opposing combined pressures of spring 108 and reduced brake pipe pressure acting in chamber 107. This unseating of check valve 106 permits fluid under pressure to flow from the quick action chamber 16 and emergency valve chamber 14 back into the brake pipe at such a rate relative to the service rate of reduction in brake pipe pressure as to prevent the differential of presures on the emergency piston 9 from increasing to the degree required to move said valve device to emergency position.

Fluid under pressure is thus vented past the check valve 106 until the pressure of fluid in the emergency valve chamber 14 and quick action chamber 16 is reduced to within the value of spring 108 of the pressure in the brake pipe at which time said spring seats the check valve 106.

In case the emergency piston 9 and auxiliary slide valve 18 should respond to a service reduction in brake pipe pressure at about the time the check valve 106 is unseated, the movement of the auxiliary slide valve 18 will lap the port 103 and thereby this auxiliary vent by way of the check valve 106 will be closed, as occurs in the construction shown in Fig. 1, where the valve 90 is seated upon the service operation of the emergency valve device.

The venting communication through port 103 and past check valve 106 has insufficient capacity to reduce the pressure of fluid in the emergency valve chamber 14 and quick action chamber 16 at as fast a rate as the brake pipe pressure is reduced upon effecting an emergency reduction in brake pipe pressure, so that upon an emergency reduction in brake pipe pressure, the required differential of pressures to move the piston 9 and slide valve 18 to emergency position will be promptly obtained, and thereby the emergency valve device will be operated to effect an emergency application of the brakes in the same manner as hereinbefore described.

From the above description of the two forms of the invention it will now be seen that means have been provided which, under all abnormal service conditions, is adapted to prevent undesired emergency operation of an emergency valve device upon a service reduction in brake pipe pressure, the means being so controlled by the emergency valve auxiliary slide valve as not to interfere with the emergency valve device when it operates as intended upon effecting either a service or an emergency reduction in brake pipe pressure. In the embodiment of the invention shown in Fig. 1, the emergency valve device merely acts as a pilot valve device for the means which are operative to prevent undesired emergency operation of the emergency valve device, while in the embodiment shown in Fig. 2, the means is incorporated as an integral part of the emergency valve device which requires that the parts of the emergency valve device be made larger than is the case in the construction shown in Fig. 1, in order to contain and properly control the relatively large vent communication including port 193 in the main slide valve 17.

While two illustrative embodiments of our invention have been described in detail, it is not our intention to limit its scope to these embodiments or otherwise than by the terms of the appended claims.

Having now described our invention, what we claim as new and desire to secure by Letters Patent, is:

1. In a fluid pressure brake, in combination, a brake pipe, a quick action chamber, an emergency valve device subject to the opposing pressures of said brake pipe and chamber, and operative upon an emergency reduction in brake pipe pressure to effect an emergency application of the brakes, and valve means subject at all times to the pressure of fluid in said brake pipe and operative upon a service reduction in brake pipe pressure to establish a communication through which fluid under pressure is adapted to be vented from said chamber to said brake pipe and operative upon an emergency reduction in brake pipe pressure to close said communication.

2. In a fluid pressure brake, in combination, a brake pipe, a quick action chamber, an emergency valve device subject to the opposing pressures of said brake pipe and chamber, said emergency valve device comprising a slide valve having a normal position and adapted to be moved therefrom upon a reduction in brake pipe pressure, and valve means operative upon a reduction in brake pipe pressure to vent fluid from the quick action chamber to the brake pipe, said slide valve controlling said valve means and being operative upon movement from said normal position to render said valve means ineffective to vent fluid under pressure from said chamber.

3. In a fluid pressure brake, in combination, a brake pipe, a quick action chamber, an emergency valve device subject to the opposing pressures of said brake pipe and chamber and comprising a slide valve having a normal position and designed to be moved from said normal position upon a service rate of reduction in brake pipe pressure to vent fluid under pressure from said chamber at a corresponding rate and upon an emergency rate of reduction in brake pipe pressure to effect an emergency application of the brakes, and valve means controlled by the opposing pressures of the brake pipe and said chamber and adapted to operate upon a reduction in brake pipe pressure to effect venting of fluid under pressure from said chamber to said brake pipe for thereby effecting a reduction in pressure in said chamber corresponding to the rate at which the brake pipe pressure is reduced in effecting a service application of the brakes, said slide valve controlling communication through which fluid is supplied from said chamber to control said valve means and being operative upon movement from normal position to vent said communication.

4. In a fluid pressure brake, in combination, a brake pipe, a quick action chamber, an emergency valve device subject to the opposing pressures of said brake pipe and chamber and comprising a slide valve having a normal position and designed to be moved from said normal position upon a service rate of reduction in brake pipe pressure to vent fluid under pressure from said chamber at a corresponding rate and upon an emergency rate of reduction in brake pipe pressure to effect an emergency application of the brakes, and valve means controlled by the opposing pressures of the brake pipe and said chamber and adapted to operate upon a reduction in brake pipe pressure to effect venting of fluid under pressure from said chamber to said brake pipe for thereby effecting a reduction in pressure in said chamber corresponding to the rate at which the brake pipe pressure is reduced in effecting a service application of the brakes, said slide valve being operative upon movement from said normal position to render said valve means ineffective to vent fluid under pressure from said chamber.

5. In a fluid pressure brake, in combination, a brake pipe, a quick action chamber, an emergency valve device subject to the opposing pressures of said brake pipe and chamber, and operative by the pressure of fluid in said chamber upon an emergency reduction in brake pipe pressure to effect an emergency application of the brakes, a movable abutment subject on one face to brake pipe pressure and on the opposite face to the pressure of fluid in said chamber, and valve means operative by said abutment upon a reduction in brake pipe pressure to vent fluid under pressure from said chamber to said brake pipe at a rate to prevent said emergency operation of said emergency valve device if the rate of reduction in brake pipe pressure is less than an emergency rate, but to permit emergency operation of said valve device if the rate of reduction in brake pipe pressure equals or exceeds an emergency rate, said emergency valve device being operative upon movement from its normal position upon a reduction in brake pipe pressure to vent fluid under pressure from said opposite face of said abutment for thereby rendering said abutment ineffective to operate said valve means upon a reduction in brake pipe pressure.

6. In a fluid pressure brake, in combination, a brake pipe, an emergency valve device subject to the opposing pressures of said brake pipe and chamber and operative by the pressure of fluid in said chamber upon an emergency reduction in brake pipe pressure to effect an emergency application of the brakes, valve means normally closing a communication from said brake pipe to said chamber and operative upon a reduction in brake pipe pressure at a rate less than an emergency rate to open said communication to permit flow of fluid under pressure from said chamber to said brake pipe at a rate to prevent operation of said valve device, and operative upon a greater rate of reduction in brake pipe pressure to close said communication to prevent flow of fluid under pressure from said chamber to said brake pipe.

7. In a fluid pressure brake, in combination, a brake pipe, an emergency valve device subject to the opposing pressures of said brake pipe and chamber and operative by the pressure of fluid in said chamber upon an emergency reduction in brake pipe pressure to effect an emergency application of the brakes, a valve normally closing a communication from said brake pipe to said chamber, a movable abutment normally subject on one face to the pressure of said brake pipe and on the opposite face to the pressure in said chamber and operative upon a reduction in brake pipe pressure to effect the operation of said valve to open said communication to permit flow of fluid under pressure from said chamber to said brake pipe at a rate to prevent operation of said valve device upon a reduction in brake pipe pressure at less than an emergency rate, said emergency valve device being operative upon response to a reduction in brake pipe pressure to subject said opposite face of said movable abutment to a pressure lower than in said chamber for rendering said abutment ineffective to operate said valve.

8. In a fluid pressure brake, in combination, a brake pipe, an emergency valve device subject to the opposing pressures of said brake pipe and a quick action chamber and designed to operate upon a service rate of reduction in brake pipe pressure to reduce the pressure in said chamber at a corresponding rate and operative upon an emergency reduction in brake pipe pressure to effect an emergency application of the brakes, and valve means subject at all times to the pressure of fluid in said brake pipe and controlled by the opposing pressures of said brake pipe and a chamber and adapted to operate upon a reduction in brake pipe pressure to establish a communication from said quick action chamber to said brake pipe through which the pressure of fluid in said quick action chamber is adapted to reduce at the rate at which the brake pipe pressure is reduced in effecting a service application of the brakes, said emergency valve device being operative to effect closure of said communication upon movement thereof in response to either a service or emergency reduction in brake pipe pressure.

9. In a fluid pressure brake, in combination, a brake pipe, an emergency valve device subject to the opposing pressures of said brake pipe and a quick action chamber and operative upon a reduction in brake pipe pressure after a predetermined differential has been established between the pressures in the brake pipe and said chamber to effect an emergency application of the brakes, a valve operative to vent fluid under pressure from said chamber to said brake pipe to effect a service rate of reduction in pressure in said chamber, flexible diaphragm means subject to the opposing pressures of the brake pipe and said chamber and operative to effect the operation of said valve upon a reduction in brake pipe pressure when a differential is established between the pressures in said chamber and brake pipe which is just less than said predetermined differential, and means acting on said diaphragm means for determining the differential of pressure upon which said diaphragm means operates said valve.

10. In a fluid pressure brake, in combination, a brake pipe, an emergency valve device subject to the opposing pressures of said brake pipe and a quick action chamber and operative upon a reduction in brake pipe pressure after a predetermined differential has been established between the pressures in the brake pipe and said chamber to effect an emergency application of the brakes, a valve operative to open a communication through which fluid under pressure is adapted to be vented from said chamber to effect a service reduction in pressure in said chamber, flexible diaphragm means subject to the opposing pressures of the brake pipe and said chamber and operative to effect the operation of said valve upon a service rate of reduction in brake pipe pressure, and another valve operative by said diaphragm to close said communication upon an emergency rate of reduction in brake pipe pressure.

11. In a fluid pressure brake, in combination, a brake pipe, an emergency valve device comprising a movable abutment subject to the opposing pressures of said brake pipe and a quick action chamber, and a slide valve operative by said abutment, said slide valve having a normal position and being movable by said abutment upon an emergency reduction in brake pipe pressure, a passage controlled by said slide valve and connecting the brake pipe with said chamber in the normal position of said slide valve, communication from the brake pipe to said chamber through said passage being closed upon movement of said slide valve, said passage being adapted to permit fluid under pressure to flow from said chamber to said brake pipe at a rate corresponding with the rate at which brake pipe pressure is reduced to effect a service application of the brakes, and a valve for preventing back flow from the brake pipe through said passage to said chamber.

12. In a fluid pressure brake, in combination, a brake pipe, an emergency valve device comprising a movable abutment subject to the opposing pressures of said brake pipe and a quick action chamber, and a slide valve operative by said abutment, said slide valve having a normal position and being movable by said abutment upon an emergency reduction in brake pipe pressure, a passage controlled by said slide valve and connecting the brake pipe with said chamber in the normal position of said slide valve, communication from the brake pipe to said chamber through said passage being closed upon movement of said slide valve, said passage being adapted to permit fluid under pressure to flow from said chamber to said brake pipe at a rate corresponding with the rate at which brake pipe pressure is reduced to effect a service application of the brakes, a valve for controlling flow of fluid under pressure from said chamber through said passage to said brake pipe, and means for preventing the operation of said valve to permit flow of fluid under pressure from said chamber to said brake pipe until a predetermined differential is obtained between the opposing pressures of said brake pipe and chamber upon a reduction in brake pipe pressures.

13. In a fluid pressure brake, in combination, a brake pipe, a quick action chamber, a main slide valve having a normal position and being movable therefrom to a position for effecting an emergency application of the brakes, an auxiliary slide valve mounted on said main slide valve and having a normal position and being movable therefrom relative to said main slide valve to an emergency position for effecting a sudden venting of fluid under pressure from said brake pipe, an emergency piston subject to the opposing pressures of said brake pipe and quick action chamber and operative when a predetermined differential is established between the pressures in said brake pipe and quick action chamber upon a reduction in brake pipe pressure to first move said auxiliary slide valve relative to said main slide valve to emergency position and to then move said main slide valve, valve means operative by a differential of pressures less than said predetermined differential to open a communication through which fluid under pressure is adapted to flow from said quick action chamber to said brake pipe at a rate to prevent obtaining said predetermined differential of pressures upon a reduction in brake pipe pressure at a rate less than an emergency rate, said auxiliary slide valve controlling said communication and being operative to open said communication in the normal position thereof and to close said communication upon movement out of said normal position towards said emergency position.

14. In a fluid pressure brake, in combination, a brake pipe, a quick action chamber, a main slide valve having a normal position and being movable therefrom to a position for effecting an emergency application of the brakes, an auxiliary slide valve mounted on said main slide valve and having a normal position and being movable therefrom relative to said main slide valve to a service position for effecting a service rate of reduction in the pressure in said quick action chamber, a piston subject to the opposing pressures of said brake pipe and chamber and designed to move said auxiliary slide valve to said service position upon a service rate of reduction in brake pipe pressure and to move said main slide valve upon an emergency rate of reduction in brake pipe pressure, valve means operative upon failure of said piston to move said auxiliary slide valve to service position upon a service rate of reduction in brake pipe pressure to establish a communication through which the pressure of fluid in said quick action chamber is adapted to reduce into said brake pipe at a service rate, said auxiliary slide valve controlling said communication and being operative to open said communication in the normal position thereof and to close said communication in the service position.

15. In a fluid pressure brake, in combination, a brake pipe, an emergency valve device comprising a movable abutment subject to the opposing pressures of said brake pipe and a quick action chamber, and valve means movable by said abutment, said valve means having a normal position for establishing a communication through which the pressure of fluid in said quick action chamber is adapted to reduce at a service rate to prevent movement of said abutment upon a service reduction in brake pipe pressure, said abutment being operative upon an emergency reduction in brake pipe pressure to move said valve means from said normal position for closing said communication.

16. In a fluid pressure brake, in combination, a brake pipe, an emergency valve device comprising a movable abutment subject to the opposing pressures of said brake pipe and a quick action chamber, and valve means movable by said abutment, said valve means having a normal position for establishing a communication through which the pressure of fluid in said quick action chamber is adapted to reduce at a service rate to prevent movement of said abutment upon a service reduction in brake pipe pressure, said valve means being movable from said normal position to another position for closing said communication and for effecting an emergency application of the brakes, said abutment being operative upon an emergency reduction in brake pipe pressure to move said valve means from said normal position to said other position.

17. In a fluid pressure brake, in combination, a brake pipe, an emergency valve device comprising a movable abutment subject to the opposing pressures of said brake pipe and a quick action chamber, and valve means movable by said abutment, said valve means having a normal position for establishing a communication from said quick action chamber to said brake pipe through which the pressure of fluid in said quick action chamber is adapted to reduce with brake pipe pressure upon a service reduction in brake pipe pressure, a check valve for preventing flow of fluid under pressure through said communication from said brake pipe to said quick action chamber, said movable abutment being operative upon an emergency reduction in brake pipe pressure to move said valve means to another position for closing said communication and for effecting an emergency application of the brakes.

18. In a fluid pressure brake, the combination of a valve device comprising a quick action chamber; a brake pipe connection; a piston subject to opposing pressures in said chamber and connection; a main emergency valve and an auxiliary valve having a movement relatively to the main valve; a piston stem carried by said piston for actuating said valves; yielding means reacting between said stem and said main valve in one direction; a movable abutment subject to opposing pressures in said chamber and connection and more sensitive than said piston; a bleed valve having two terminal closed positions and an intermediate open position in which last it bleeds said chamber at a service rate, said valve being shiftable by said abutment between said terminal positions; and spring means resisting motion of said bleed valve and abutment and so arranged as to arrest the valve in said intermediate open position when brake pipe pressure is falling at a service rate.

19. In a fluid pressure brake system, the combination of an emergency valve of the type including a normally charged quick action chamber, a slide valve loaded by quick action chamber pressure, and a piston for actuating said valve, said piston being subject to opposing chamber and brake pipe pressures and being capable of limited lost motion relatively to said valve against yielding resistance when brake pipe pressure is reduced at an emergency rate; and a more sensitive bleed valve mechanism for venting said chamber at a service rate, said mechanism including a bleed valve having an intermediate open position and two closed terminal positions, a movable abutment for actuating said bleed valve, and subject to opposing chamber and brake pipe pressures, and yielding means for arresting the bleed valve in said intermediate position when brake pipe pressure falls at a service rate.

20. In a fluid pressure brake, in combination, a brake pipe, an emergency valve device subject to the opposing pressures of said brake pipe and a quick action chamber and operative upon a reduction in brake pipe pressure after a predetermined differential has been established between the pressures in the brake pipe and said chamber to effect an emergency application of the brakes, valve means movable to one position to open a communication through which fluid under pressure is adapted to be vented from said chamber to effect a service reduction in pressure in said chamber, and movable further to another position to close said communication, and flexible diaphragm means subject to the opposing pressures of the brake pipe and said chamber and operative to shift said valve means to said first position upon a service rate of reduction in brake pipe pressure, and operative to shift said valve means to said other position upon an emergency reduction in brake pipe pressure.

JOHN CANETTA.
CLYDE C. FARMER.
CARLTON D. STEWART.